UNITED STATES PATENT OFFICE.

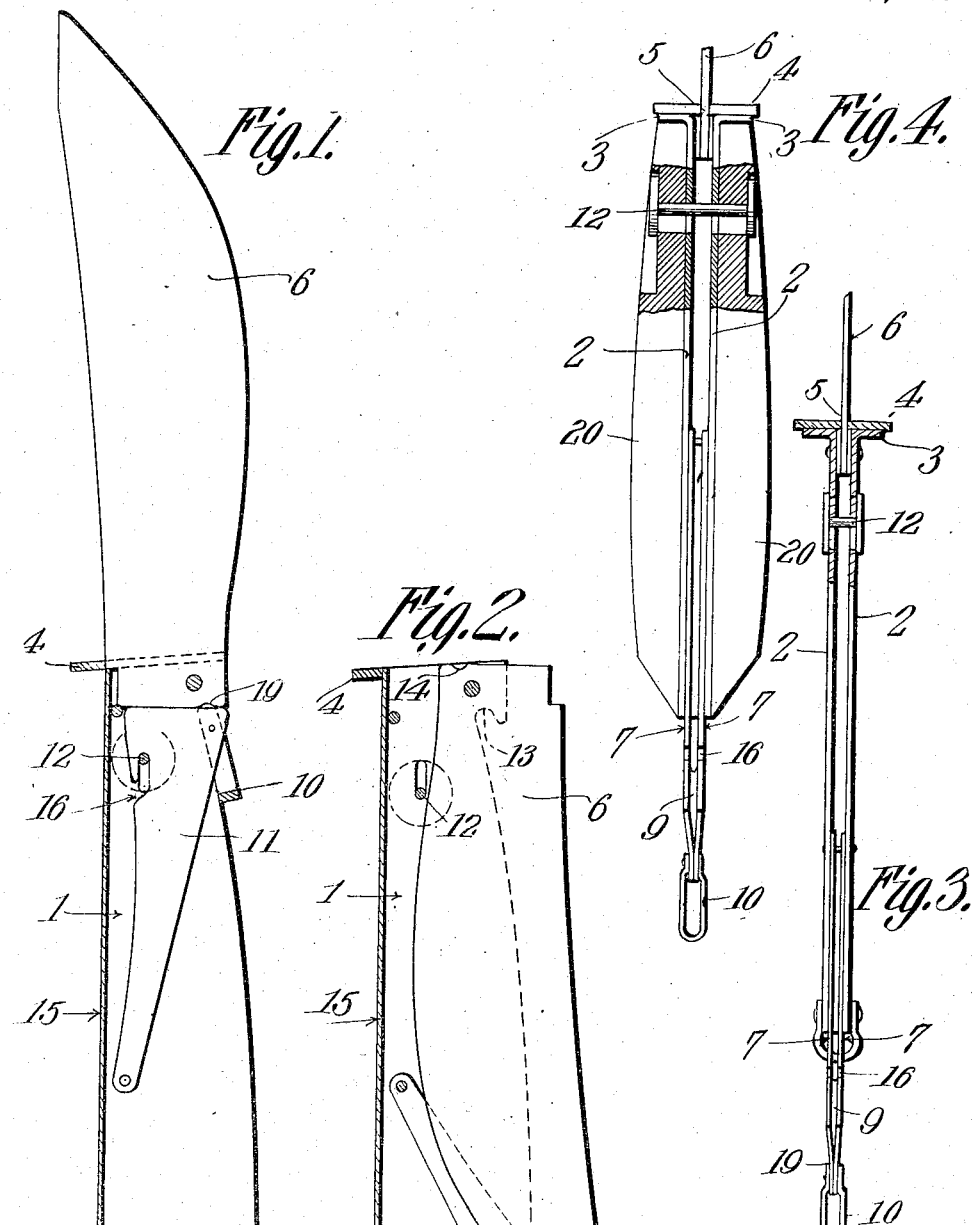

DANIEL H. HOLMAN, OF MOSCOW, IDAHO.

HUNTING-KNIFE.

No. 924,070.  Specification of Letters Patent.  Patented June 8, 1909.

Application filed August 28, 1908. Serial No. 450,727.

*To all whom it may concern:*

Be it known that I, DANIEL H. HOLMAN, a citizen of the United States, residing at Moscow, in the county of Latah and State of Idaho, have invented a new and useful Improvement in Hunting-Knives, of which the following is a specification.

This invention relates to hunting knives.

The objects of the invention are, the provision in a merchantable form of a device of the above mentioned class which shall be inexpensive in construction, facile in operation and devoid of complicated parts; the provision of novel means whereby, in a hunting knife having a folding blade longer than the handle, the tip of the blade may be protected when the blade is folded into the handle; the provision of novel means for locking the blade in an open position.
With these and other objects in view, as will hereinafter more fully appear, the invention consists in the novel construction and arrangement of parts hereinafter described, delineated in the accompanying drawings, and particularly pointed out in the appended claims, it being understood that various changes in the form, proportions, size and minor details of the structure may be made without departing from the spirit or sacrificing any of the advantages of the invention.

Similar numerals of reference are employed to indicate corresponding parts throughout the several figures of the drawings.

In the accompanying drawings, Figure 1 is a longitudinal section showing the blade 6 locked in an open position; Fig. 2 is a longitudinal section showing the blade 6 locked in a closed position; Fig. 3 is a top-plan, a portion of the handle 1 being cut away to show in detail the catch 12, the shoulders 3 and the hand protector 4; Fig. 4 is a top-plan of a modified form of handle, portion of the handle being broken away.

In carrying out my invention, I provide a handle 1 which may be of any form. Preferably, however, as shown, it is thin and trough shaped, formed from a single sheet of metal bent to form parallel side pieces 2 united at their bases 15. From the ends of the side pieces 2, and integral therewith, project the shoulders 3. Mounted upon the shoulders 3 and disposed substantially normal to the planes of the side pieces 2, is the hand protector 4, having a slot 5 registering with the space between the side pieces 2.

Pivoted in the handle 1 and folding therein, is the blade 6, which may be of greater length than the handle 1. Pivoted in the butt of the handle 1 is a guard 11 adapted to receive the blade-tip 8 when the blade 6 is folded into the handle 1. The guard 11 is formed from a pair of resilient leaves 7, united at their bases at one end, as shown at 9. Pivoted to the resilient leaves 7 is the loop 10. The guard 11 is provided with a notch 16 adapted to be engaged, when the blade 6 is in the position shown in Fig. 1, by the catch 12, which is slidably mounted in the handle 1.

In the butt of the blade 6 is the notch 14 adapted to register with the notch 13 in the handle 1, when the blade 6 is open as shown in Fig. 1. A stop 17 in the butt of the handle, limits the backward movement of the guard 11.

When the blade 6 is closed into the handle 1, as shown in Fig. 2, the resilient leaves 7 will engage frictionally the sides of the blade tip 8, and when the loop 10 is in the position shown in Fig. 2, it will engage the leaves 7 and press them toward each other and upon the sides of the blade tip 8, the extremity of the loop 10 being in contact with the back of the blade 6, locking it between the leaves 7 as shown, the extremity of the blade being within the guard 11 and fully protected against accidental engagement with the pocket. When it is desired to open the blade into the position shown in Fig. 1 the loop 10 is turned back, freeing the tip 8 of the blade and reducing the clamping effect of the resilient leaves 7 upon the sides of the blade-tip 8. The blade 6 is then swung wide open and the guard 11 turned into the handle. When the guard 11 is in this position the end of the guard 11 will come into contact with the butt of the blade 6 as shown in Fig. 1 and hold the said blade in its open position. When the guard 11 is folded into the handle 1 the resilient leaves 7 will engage the inner surfaces of the side-pieces 2, and the notch 16 will register with the catch 12. The end 19 of the loop 10 will engage the registering notches 13 and 14, and when the loop 10 is pressed down upon the handle 1 as shown in Fig. 1, the guard 11 will be firmly seated against the butt of the blade 6 and the catch 12 forced into the notch 16. The catch 12 may then be shoved forward from the position shown in Fig. 2 to that shown in Fig. 1. When the blade 6 is in the position shown in Fig. 1, it is firmly held in an open position by the contact between the end of the guard 11 and the butt of the blade 6. The guard 11 is itself held in position by the contact between the resilient leaves 7 and the inner surfaces of the side pieces 2, by the locking engagement between the end 19 of the loop 10 and the registering notches 13 and 14 and by the positive locking effect produced by sliding the catch 12 in the notch 16.

If desired an eye 18 may be attached to the butt of the handle and to this eye a cord, key-chain or other means adapted to attach the knife to the person, may be fastened.

The particular form of handle hereinbefore described may be used when a thin, inexpensive handle is desired. It is obvious however, that another handle such as that shown in Fig. 4, may be employed. In such case, the grips 20 are attached to the side pieces 2 and the catch 12 lengthened in proportion to the thickness of the attached grips 20.

It is the common practice to provide jack and hunting knives having a blade folding into a handle, with a "back-spring," so called, whereby the blade may be held in either an open or a folded position. In the particular form of handle herein shown and described, no such back-spring is provided, but it is obvious that the invention is applicable to all knives having a folding blade, whether of the back-spring type or otherwise.

Having thus described my invention, my claims are as follows;

1. In a device of the class described, a handle; folding into the handle, a blade of greater length than the handle; pivoted in the butt of the handle, a pair of resilient leaves united at their bases, and arranged to receive the tip of the blade when the blade is folded; a loop pivoted to the resilient leaves and movable into compressive contact with the resilient leaves and locking contact with the back of the blade when the blade is folded into the handle.

2. In a device of the class described, a handle; folding into the handle, a blade of greater length than the handle; pivoted in the butt of the handle, a guard arranged to receive the tip of the blade; a loop pivoted to the guard and movable into locking contact with the back of the blade when the blade is folded into the handle.

3. In a device of the class described, a handle; folding into the handle, a blade of greater length than the handle; pivoted in the butt of the handle, a guard for the tip of the blade having a notch in its lower edge, the end of the said guard being movable into engagement with the butt of the blade when the blade is open; slidably mounted in the handle, a catch, movable into locking engagement with the notch in the guard, when the guard is in engagement with the butt of the blade.

4. In a device of the class described, a handle; folding into the handle, a blade of greater length than the handle; the said handle and blade having notches in registration when the blade is open; pivoted in the butt of the handle, a guard for the tip of the blade, the end of said guard being movable into engagement with the butt of the blade when the blade is open; a loop pivoted to the guard and movable into locking contact with the registering notches in the blade and the handle.

In testimony that I claim the foregoing as my own, I have hereto affixed my signature in the presence of two witnesses.

DANIEL H. HOLMAN.

Witnesses:
H. R. SMITH,
C. J. ORLUND.